US012421051B2

(12) United States Patent
Hatteland

(10) Patent No.: US 12,421,051 B2
(45) Date of Patent: Sep. 23, 2025

(54) METHOD, SYSTEM AND COMPUTER PROGRAM FOR CONTROLLING AN AUTOMATED STORAGE AND RETRIEVAL SYSTEM DURING REBUILDING ITS PHYSICAL DESIGN

(71) Applicant: Autostore Technology AS, Nedre Vats (NO)

(72) Inventor: Karl Hatteland, Oslo (NO)

(73) Assignee: AutoStore Technology AS, Nedre Vats (NO)

( * ) Notice: Subject to any disclaimer, the term of this patent is extended or adjusted under 35 U.S.C. 154(b) by 663 days.

(21) Appl. No.: 17/756,014

(22) PCT Filed: Nov. 19, 2020

(86) PCT No.: PCT/EP2020/082698
§ 371 (c)(1),
(2) Date: May 13, 2022

(87) PCT Pub. No.: WO2021/099474
PCT Pub. Date: May 27, 2021

(65) Prior Publication Data
US 2022/0388772 A1   Dec. 8, 2022

(30) Foreign Application Priority Data
Nov. 20, 2019   (NO) .................................... 20191379

(51) Int. Cl.
*B65G 43/00* (2006.01)
*B65G 1/04* (2006.01)
(Continued)

(52) U.S. Cl.
CPC ........... *B65G 43/00* (2013.01); *B65G 1/0478* (2013.01); *G06Q 10/047* (2013.01);
(Continued)

(58) Field of Classification Search
CPC ................ B65G 1/0464; B65G 1/0478; B65G 2201/0235; B65G 43/00; B65G 1/1378;
(Continued)

(56) References Cited

U.S. PATENT DOCUMENTS

2018/0075402 A1\* 3/2018 Stadie .............. G05B 19/41895
2018/0276606 A1\* 9/2018 Stadie .................... G06Q 10/04
(Continued)

FOREIGN PATENT DOCUMENTS

JP     HI0194404 A    4/1989
JP    2015079318 A    4/2015
(Continued)

OTHER PUBLICATIONS

Sun Yue, Notice of First Examination Opinion for Chinese Patent Application No. 202080080279.2, mailed Jun. 28, 2024, 10 pages (with translation), China Intellectual Property Office, Beijing, China.
(Continued)

*Primary Examiner* — Thomas Randazzo
(74) *Attorney, Agent, or Firm* — Baker Botts L.L.P.

(57) ABSTRACT

A method, system, and computer program for controlling operation of an automated storage and retrieval system during rebuilding a physical design. The method includes a planning and designing phase that establish a new design. Storage columns with a rail system that is affected by the rebuilding are excluded from a selection of available routes for container handling vehicles operating on the storage system. In a relocation phase, storage containers located in excluded storage columns are relocated to other storage columns. In a rerouting phase, traffic flow of container handling vehicles are rerouted according to available routes. A master controller is instructed to control the vehicles according to the available routes. In a rebuilding phase, the storage system is rebuilt according to the new physical
(Continued)

design. In a final routing phase, the routing planner controls traffic flow of the vehicles according to available routes on the rail system of the rebuilt physical design.

7 Claims, 5 Drawing Sheets

(51) Int. Cl.
  *G06Q 10/047* (2023.01)
  *G06Q 10/0631* (2023.01)
  *G06Q 10/0633* (2023.01)
  *G06Q 10/08* (2024.01)
(52) U.S. Cl.
  CPC ... *G06Q 10/06316* (2013.01); *G06Q 10/0633* (2013.01); *G06Q 10/08* (2013.01); *B65G 1/0464* (2013.01); *B65G 2201/0235* (2013.01)
(58) Field of Classification Search
  CPC .............. B65G 1/1373; G06Q 10/047; G06Q 10/06316; G06Q 10/0633; G06Q 10/08; G05D 1/00
  See application file for complete search history.

(56) References Cited

U.S. PATENT DOCUMENTS

| | | | |
|---|---|---|---|
| 2018/0276607 A1* | 9/2018 | Stadie | G05D 1/0255 |
| 2018/0276608 A1* | 9/2018 | Stadie | B66F 9/063 |
| 2018/0306587 A1* | 10/2018 | Holz | B66F 9/0755 |
| 2019/0092568 A1 | 3/2019 | Ingram-Tedd et al. | |
| 2020/0012268 A1* | 1/2020 | Stadie | G05D 1/0255 |

FOREIGN PATENT DOCUMENTS

| | | | |
|---|---|---|---|
| WO | 2015185628 A2 | 12/2015 | |
| WO | WO-2018146304 A1 * | 8/2018 | ........... B65G 1/0464 |
| WO | 2018162757 A1 | 9/2018 | |
| WO | 2018233886 A1 | 12/2018 | |
| WO | 2019081092 A1 | 5/2019 | |
| WO | 2019118235 A1 | 5/2019 | |

OTHER PUBLICATIONS

Sun Yue, Search Report for Chinese Patent Application No. 202080080279.2, mailed Jun. 28, 2024, 4 pages (with translation), China Intellectual Property Office, Beijing, China.
International Search Report issued in International Application No. PCT/EP2020/082698, mailed Apr. 16, 2021 (3 pages).
Written Opinion issued in International Application No. PCT/EP2020/082698; Dated Apr. 16, 2021 (6 pages).
International Preliminary Report on Patentability issued in International Application No. PCT/EP2020/082698; mailed Feb. 17, 2022 (14 pages).
Search Report issued in Norwegian Application No. 20191379; Dated May 4, 2020 (2 pages).
Le Huy Anh, Office Action for Vietnamese Patent Application No. 1202203806, dated Aug. 29, 2024 2024, 4 pages, pub. by Vietnamese Intellectual Propery Office, Hanoi, Vietnam.
Mari Uchida, Notice of Reasons for Rejection for Japanese Patent Application No. 2022529006, dated Oct. 21, 2024, 11 pages, pub. by JPO, Japan.
Sun Yue, Notice of the Second Office Action for Chinese Patent Application No. 202080080279.2, mailed Mar. 31, 2025, 7 pages (with translation), National Intellectual Property Administration, PRC, Beijing, China.
M. Uchida, "Notice of reasons for rejection" (in Japanese patent application 2022-529006), pub. by Japan Patent Office, Jan. 30, 2025, 2 pages (in Japanese), accompanied by Anonymous, machine English translation of same, 3 pages.
Le Huy Anh, Office Action for Vietnamese Patent Application No. 1202203806, dated Jun. 5, 2025, 4 pages, pub. by Vietnamese Intellectual Property Office, Hanoi, Vietnam. (English translation provided.).

* cited by examiner

Fig. 2, control system - 500

METHOD, SYSTEM AND COMPUTER PROGRAM FOR CONTROLLING AN AUTOMATED STORAGE AND RETRIEVAL SYSTEM DURING REBUILDING ITS PHYSICAL DESIGN

FIELD OF THE INVENTION

The present invention relates to an automated storage and retrieval system for storage and retrieval of containers handled by container handling vehicles, and more specifically to a method, system and computer program for controlling operation of the automated storage and retrieval system during rebuilding its physical design.

BACKGROUND

FIG. 1 discloses a typical prior art automated storage and retrieval system 1 with a framework structure 100 and with container handling vehicles 201 are operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of the framework structure 100, on which rail system 108 a plurality of container handling vehicles 201 are operated to raise storage containers 106 from, and lower storage containers 106 into, the storage columns 105, and also to transport the storage containers 106 above the storage columns 105.

The rail system 108 comprises a first set of parallel rails 110 arranged to guide movement of the container handling vehicles 201 in a first direction X across the top of the frame structure 100, and a second set of parallel rails 111 arranged perpendicular to the first set of rails 110 to guide movement of the container handling vehicles 201 in a second direction Y which is perpendicular to the first direction X. Also shown in FIG. 1 is a first rail in a first direction X, 110a, a second rail in a first direction X 110b, a first rail in a second direction Y, 111a and a second rail in a second direction Y, 111b.

Storage containers 106 are stored in the columns 105 which define a third direction Z which is orthogonal to the first direction X and the second direction Y. The storage containers 106 are accessed by the container handling vehicles 201 through access openings 112 in the rail system 108, i.e. the rail system 108 is arranged on the framework structure 100 defining the circumference of each access opening 112 on top of each storage column 105.

The container handling vehicles 201 can move laterally above the storage columns 105, i.e. in a plane which is parallel to the horizontal X-Y plane. Storage containers are stored in the storage columns 105.

The upright members 102 of the framework structure 100 may be used to guide the storage containers when raising of the containers out from and lowering of the containers into the columns 105. The stacks 107 of containers 106 are typically self-supportive.

$Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201 can be said to travel in layer $Z=0$, and each storage column 105 can be identified by its X and Y coordinates.

The storage volume of the framework structure 100 has often been referred to as a grid 104, where the possible storage positions within storage columns 105 in this grid is referred to as a storage cell. Each storage column 105 may be identified by a position in an X- and Y-direction, while each storage cell may be identified by a container number in the X, Y and Z-direction.

The rail system 108 typically comprises rails with grooves in which wheels of the storage container vehicles 201 can run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of a rail system 108 comprising rails and parallel tracks in both X and Y directions.

In the framework structure 100, most of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle 201 and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201 can drop off storage containers 106 to be transported to an access or a transfer station, and the second port column 120 may be a dedicated pick-up port column where the container handling vehicles 201 can pick up storage containers 106 that have been transported from an access or a transfer station.

The access station may typically be a picking or a stocking station where product items are removed from or positioned in the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

When a storage container 106 stored in one of the columns 105 disclosed in FIG. 1 is to be accessed, one of the container handling vehicles 201 is instructed to retrieve the target storage container 106 from its position and transport it to the drop-off port column 119. This operation involves moving the container handling vehicle 201 to a location above the storage column 105 in which the target storage container 106 is positioned, retrieving the storage container 106 from the storage column 105 using a lifting device (not shown) of the container handling vehicle 201 and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 201 that is subsequently used for transporting the target storage container to the drop-off port column 119, or with one or a plurality of other cooperating container handling vehicles 201. Alternatively, or in addition, the automated storage and retrieval system 1 may have container handling vehicles 201 specifically dedicated to the task of temporarily removing storage containers from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201 positions the storage container 106 at the desired position. The removed storage containers 106 may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106, and the movement of the container handling vehicles 201 so that a desired storage container 106 can be delivered to the desired location at the desired time without the container handling vehicles 201 colliding with each other, the automated storage and retrieval system 1 comprises a control system 500 which typically is computerized and which typically comprises a database for keeping track of the storage containers 106.

If the automated storage and retrieval system 1 described above is to be modified by rebuilding it, the rail system 108 will normally be affected when storage columns 105 and/or port columns 119, 120 are added and/or removed. When for instance a storage column 105 with a rail system 108 is added, the existing rail system on the adjoining storage column that it is to be connected to will be affected and cannot be used during the rebuilding. Similarly, if a storage column 105 with a rail system 108 is removed, the rail system on the adjoining storage column that it is connected to will be affected and cannot be used.

This means that some previous available routes for the container handling vehicles 201 running on the rail system will not be available such that a downtime is necessary by temporary shutting down the automated storage and retrieval system 1 until the rebuilding of the system 1 is completed.

Downtime of the system 1 is however unwanted since it can be expensive for an operator. The present invention addresses and solves this problem by a method and system for controlling an automated storage and retrieval system 1 such that it is operating normally, at least in an unaffected zone of the system, during rebuilding of the system 1.

SUMMARY OF THE INVENTION

The invention is defined by a method for controlling an automated storage and retrieval system during rebuilding of its physical design. The storage and retrieval system comprises a framework structure forming a three-dimensional storage grid structure for storing storage containers, where the grid structure forms vertical storage columns each having same horizontal area defined by the size of an access opening of the vertical storage columns and where a rail system is arranged on the framework structure defining the circumference of each access opening on top of each storage column, the rail system providing available routes for container handling vehicles handling and transferring the storage containers to and from the storage columns, each vehicle comprising a vehicle controller communicating with a master controller. The master controller assigns jobs to each vehicle for handling and transferring the storage containers and controlling traffic flow of vehicles according to a routing planner. The master controller and/or the routing planner is connected to a database which comprises layout information of the rail system and location information of vehicles and storage containers. The routing planner determines an optimal route on the rail system for each vehicle based on the available routes according to the layout information of the rail system and location information of each vehicle and storage container. The method comprises the following steps:

after a designing step, where a new physical design of the framework and corresponding rail system is designed, a step of designating a portion of the rail system to be a buffer zone where the rail system will be affected by the rebuilding and a portion of the rail system that is to be removed from the automated storage and retrieval system, the step including updating the database of layout information with the new physical design and the rail system affected by the rebuilding;

a relocating step, where storage containers having storage positions in storage in columns below the portion of the rail system in the buffer zone and the portion of the rail system that is to be removed are relocated;

a temporary routing step, where the database updates the layout information of the rail system to exclude from the available routes the portion of the rail system that is in the buffer zone and the portion of the rail system that is to be removed, the routing planner rerouting traffic flow of the container handling vehicles according to the available routes unaffected by the rebuilding, and the master controller being instructed by the routing planner to control the vehicles according to the available routes;

after a rebuilding step, where the automatic storage and retrieval system is rebuilt according to the new physical design by adding and/or removing portions of framework and rail system, a final routing step, where the layout information of the rail system in the database is updated to include within the available routes the portion of the rail system within the buffer zone and a new portion of the rail system which has been built, the routing planner using the updated layout information to route traffic flow of the vehicles on the rail system after rebuilding of the physical design of the automated storage and retrieval system.

According to one embodiment, the buffer zone is defined as the storage columns and corresponding rail system adjoining storage columns that is to be removed or added during rebuilding. The buffer zone functions as a boundary between a portion of the rail system that can be used and a portion of the rail system that cannot be used during a rebuilding process.

According to one embodiment, storage containers are relocated by moving the storage containers to storage columns unaffected by the rebuilding and/or to locations external to the storage and retrieval system. In this way, storage containers in storage columns affected by the rebuilding will be accessible after the buffer zone has been established.

According to one embodiment, the location information in the database is updated with new storage positions of relocated storage containers.

According to one embodiment, access to the buffer zone is physically blocked by placing barriers on a portion of the rail system in the buffer zone after rerouting traffic flow. The barriers are removed prior to the final routing step. By placing barriers in the buffer zone, faulty container handling vehicles will not be able to pass the buffer zone.

According to one embodiment, the database is updated with addresses of storage columns according to the new physical design. Each storage column has a unique address, typically in the cartesian coordinate system. When a storage and retrieval system is expanded in the x- and/or y-direction(s), new storage columns can be addressed with coordinates having incremented coordinate values continuing from the coordinates of existing adjoining storage columns. If the storage and retrieval system is expanded in the negative x-direction for instance relative to an existing storage column addressed as (1, 1), the coordinates addressing all storage columns in can be shifted in the x-direction. A similar renumbering of the address of each storage column can be performed when storage columns 105 are removed.

According to one embodiment, new storage columns of the rebuilt storage and retrieval system are filled with storage containers, typically increasing the storage capacity of the storage and retrieval system. Storage containers already stored in existing columns of the unaffected zone of the storage and retrieval system may be relocated and/or new storage containers may be stored in the new storage columns as soon as they are input to the storage and retrieval system.

The present invention is further defined by an automated storage and retrieval system having a control system for controlling operation of the system during rebuilding of its physical design in accordance with the method described above. The storage and retrieval system comprises a framework structure forming a three-dimensional storage grid structure for storing storage containers, where the grid structure forms vertical storage columns each having same horizontal area defined by the size of access opening of the vertical storage columns and where a rail system is arranged on the framework structure defining the circumference of each access opening on top of each storage column. The rail system provides available routes for container handling vehicles handling and transferring the storage containers to and from the storage columns. The control system comprises a master controller connected to a routing planner and to vehicle controllers of container handling vehicles for controlling traffic flow of the vehicles according to the routing planner. A database is connected the master controller and/or the routing planner. The database comprises layout information of the rail system and location information of vehicles and storage containers, the layout information of the rail system being updated in the database at times during the designing step, the temporary routing step and the final routing step during the method described above. The routing planner is configured to determine an optimal route on the rail system for each vehicle based on the available routes according to the layout information of the rail system and location information of each vehicle and storage container that is stored on the database at that time. The available routes for the routing planner to choose from during the designing step, the temporary routing step and the final routing step are different in each case.

The invention is further defined by a computer program that when executed by a processor in a control system of an automated storage and retrieval system performs the method described above for controlling the automated storage and retrieval system during rebuilding of the physical design of the system. The control system may comprise a routing planner connected to a database comprising layout information of the rail system and location information of vehicles and storage containers, the routing planner determines an optimal route on the rail system for each vehicle of the automated storage and retrieval system based on available routes according to the layout information and location information of each vehicle and storage container, as described above.

BRIEF DESCRIPTION OF THE DRAWINGS

The following drawings are appended to facilitate the understanding of the invention. The drawings show embodiments of the invention, which will now be described by way of example only, where.

REFERENCES

Figure 1:
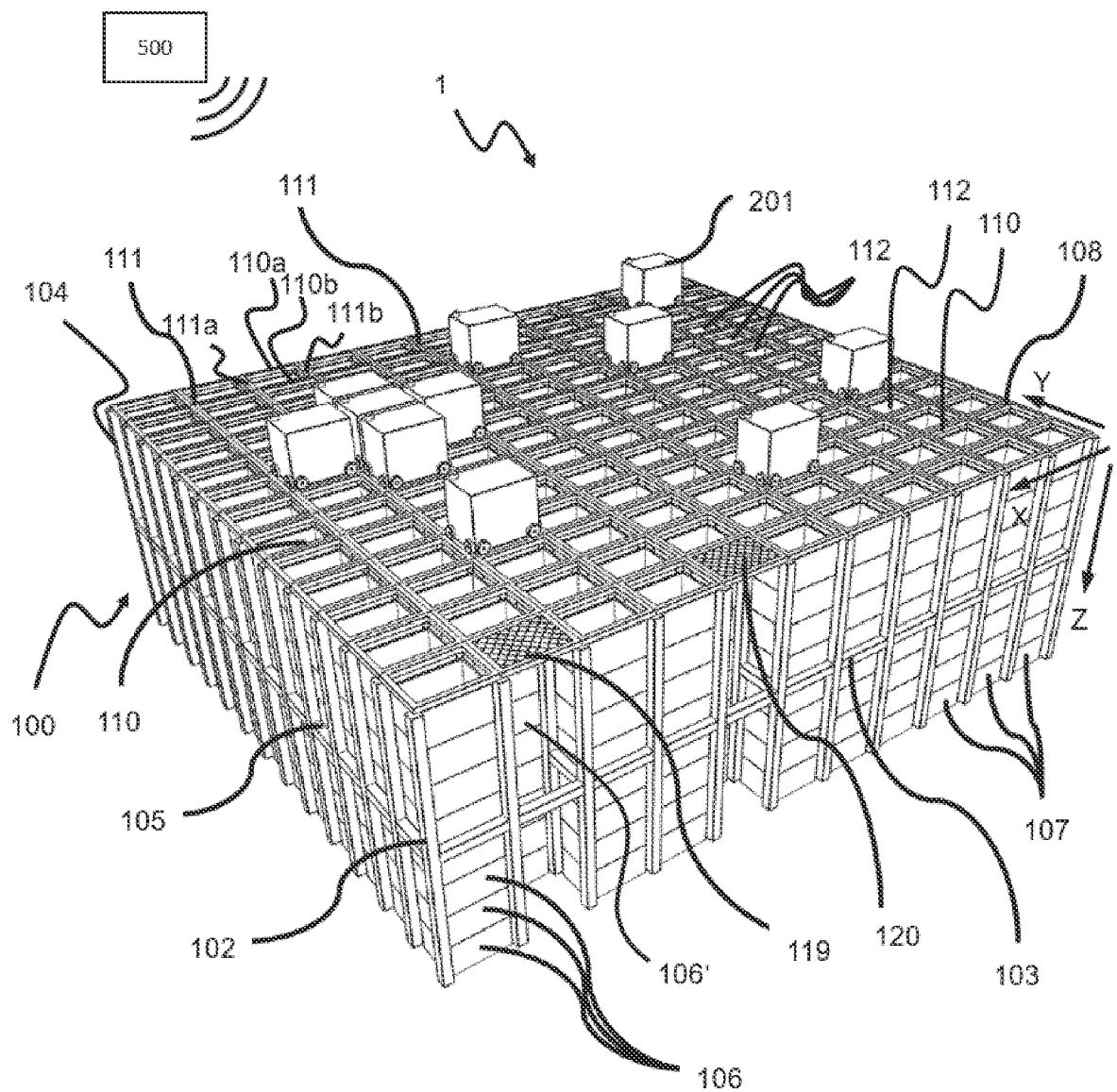
FIG. 1 is a perspective view of a framework structure of a prior art automated storage and retrieval system.

100—Framework structure
102—Upright members of framework structure
103—Horizontal members of framework structure
104—Storage grid structure 105—Storage column
106—Storage container
106'—Particular position of storage container
107—Stack
108—Rail system
110—Parallel rails in first direction (X)
110a—First rail in first direction (X)
110b—Second rail in first direction (X)
111—Parallel rail in second direction (Y)
111a—First rail of second direction (Y)
111b—Second rail of second direction (Y)
112—Access opening
119—First port column
120—Second port column
200—Routing planner
201—Container handling vehicle
210—Database (DB)
220—Master controller
230—Vehicle controller
X—First direction
Y—Second direction
Z—Third direction
500—Control system

DETAILED DESCRIPTION OF THE INVENTION

In the following description, the invention will be explained in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIG. 1, i.e. a number of upright members 102 and a number of horizontal members 103, which are supported by the upright members 102, and further that the framework structure 100 comprises a first, upper rail system 108 in the X direction and Y direction. The framework structure 100 provides storage compartments in the form of storage columns 105 provided between the members 102, 103, where storage containers 106 are stackable in stacks 107 within the storage columns 105.

The framework structure 100 can be of any size, and it is understood that it can be considerably wider and/or longer and/or deeper than the one disclosed in FIG. 1. For example, the framework structure 100 may have a horizontal extent of more than 700×700 columns and a storage depth of more than twelve containers.

As understood from the description, rebuilding of a design of the storage system 1 will influence the rail system 108 such that some routes currently used by the container handling vehicles 201 will not be accessible during the rebuilding process. Previously, a storage and retrieval system had to be shut down during rebuilding.

The present invention provides a method, system and computer program enabling rebuilding of the storage and retrieval system while it is operating. This means that there is no need for shutting the system down while it is being rebuilt.

Figure 2:
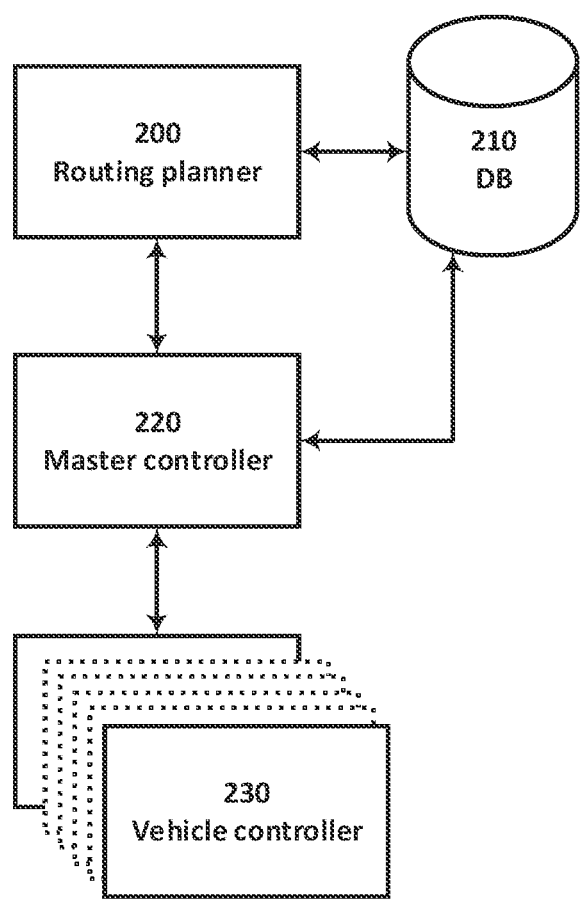
FIG. 2 shows components comprised in the control system for controlling an automated storage and retrieval system.

FIG. 2 shows components comprised in the control system 500 for controlling an automated storage and retrieval system. A master controller 220 is connected to a routing planner 200 and to vehicle controllers 230 in each container handling vehicle 201. A database is connected to the routing planner 200 and/or the master controller 220. The database 210 comprises layout information of the grid structure 104 as well as location information of vehicles 201 and storage containers 106.

Figure 3:
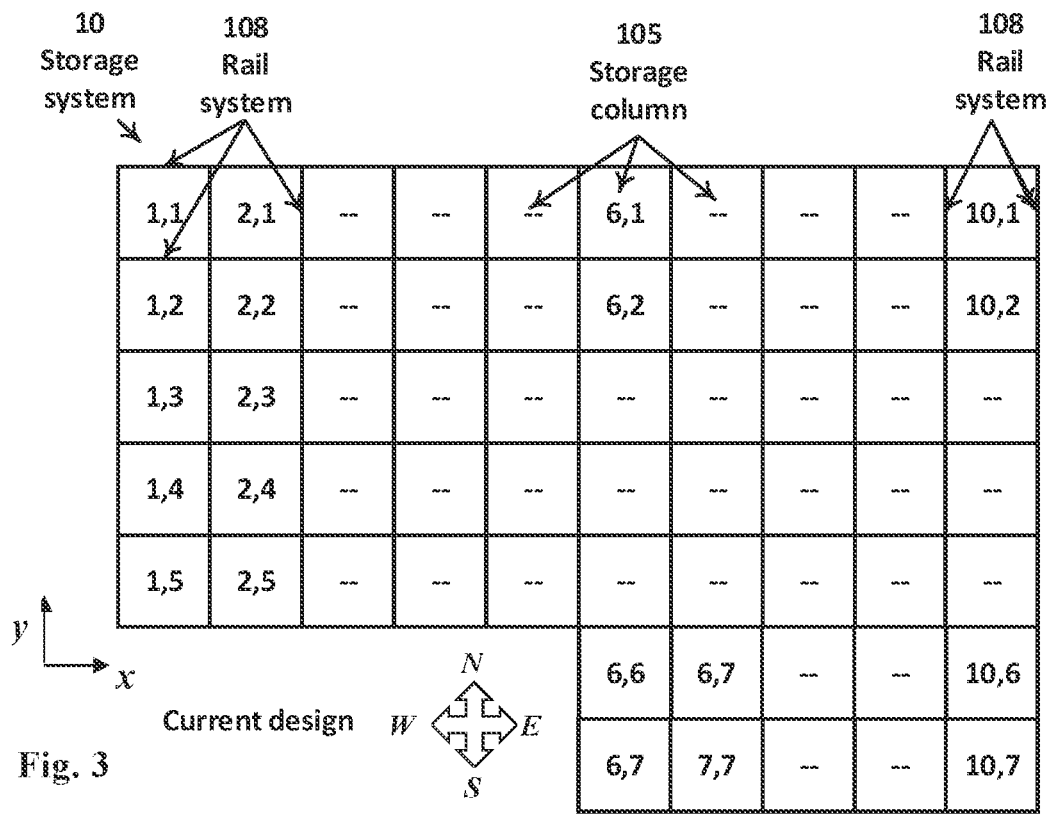
FIG. 3 is a top view of an exemplary existing design of a storage and retrieval system.

The layout of the storage system 1 is typically described according to cartesian x, y-coordinates defining each storage column 105, as shown in FIG. 3. The coordinates of each storage column 105 will also reflect the layout of the rail system 108 since each storage column 105 comprises a portion of the rail system 108 on its top part.

The routing planner 200 comprises a processor running a computer program for determining an optimal route on the rail system 108 for each job assigned to a vehicle 201. A job may for instance be to retrieve a specific storage container from a specific storage column 201 and deliver it to a specific port column for further handling. The optimal route will be based on layout information of the rail system 108 and currently available routes. The routing planner 200 will instruct the master controller 220 to control each vehicle 201 according to the available and optimal routes for assigned jobs. An optimal route will typically be the shortest and/or fastest route for a job that will not come into conflict with routes of other vehicles. The master controller will then transmit control instructions to each container handling vehicle 201, the control instructions comprise information of the job to perform and route to take for that job.

The method performed for controlling an automated storage and retrieval system 1 during reconfiguration of its physical design will now be explained with reference to FIG. 3 to 7.

FIG. 3 shows a top view of an exemplary existing design of a storage and retrieval system 1. For simplicity, the figure illustrates an example of a smaller storage system comprising a total of 60 storage columns. Each storage column is uniquely identified by its address/coordinates, e.g. the upper left storage column in the figure is identified by its x, y-coordinates (1,1) and the lower right is identified by (10,7).

The rail system 108 is arranged on top of the framework structure 100 defining the circumference of each access opening 112 on top of each storage column 105. The resulting grid pattern of the rail system 108 provides different routes for each container handling vehicle 201.

When the storage and retrieval system 1 is to be rebuilt according to a new design, the first step of the method is to design the new framework and corresponding rail system 108.

Figure 4:
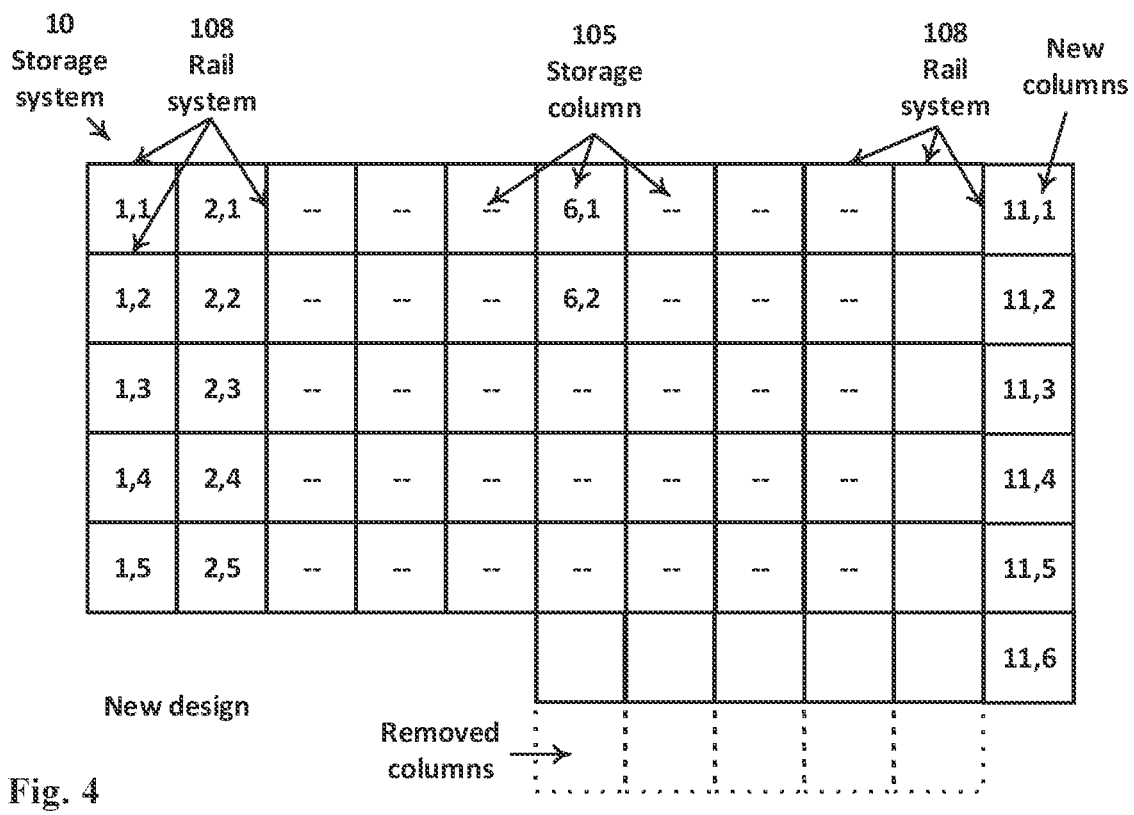
FIG. 4 is a top view of an exemplary rebuilt design of the storage and retrieval system.

FIG. 4 shows an example of a modified and exemplary rebuilt design of the storage system 1 shown in FIG. 3. In this new design, the storage columns 105 addressed as (6,7) to (10,7) are removed and new storage columns 105 addressed as (11,1) to (11,6) are added. When storage columns 105 with a corresponding rail system 108 are added to or removed from an existing storage and retrieval system 1, a portion of the rail system 108 on existing adjoining storage columns 108 will be affected by the rebuilding and cannot be used for container handling vehicles 201.

When a storage and retrieval system 1 is expanded in the x- and/or y-direction(s), new storage columns can be addressed with coordinates having incremented coordinate values continuing from the coordinates of existing adjoining storage columns 105, for example, increasing integer values when the expansion is in the positive x- and/or y-direction(s), represented by east (E) and south (S) directions in FIG. 3. This is reflected by the marked new columns in FIG. 4.

If, on the other hand, the storage and retrieval system 1 is expanded in the negative x- and/or y-direction(s), represented by west (W) and north (N) in FIG. 3, the coordinates addressing all storage columns can be displaced such that the storage column 105 located at the upper left (N/W) in FIG. 3 is starting with (1,1) as its coordinates. A similar renumbering of the address of each storage column can be performed when storage columns 105 are removed.

Figure 5:
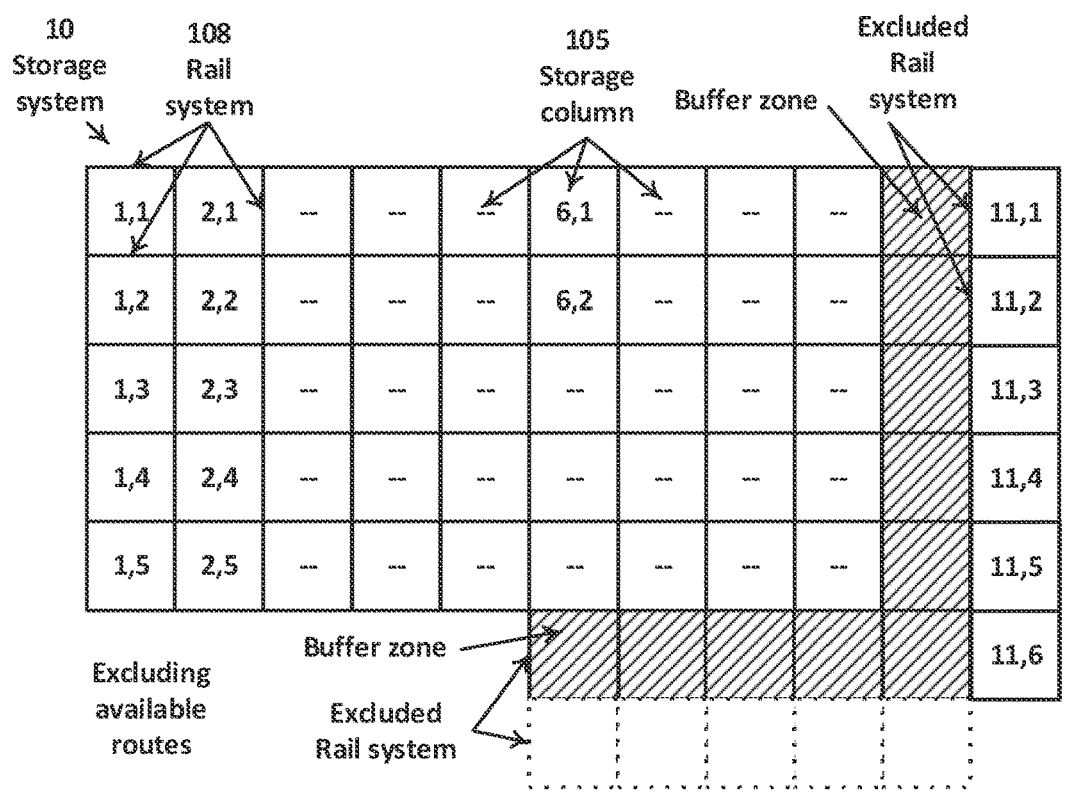
FIG. 5 is a top view of the storage and retrieval system where the excluded rail system in a buffer zone is marked.

FIG. 5 illustrates the storage columns 105 that, in addition to the storage columns that are being removed or rebuilt, will be affected when the storage system is rebuilt according to the new design shown in FIG. 4. This "buffer zone" is shown with the hatching in FIG. 5 and comprises a portion of the rail system 108 on top of the storage columns 105 that will be affected by removing or adding adjoining storage column 105. The portion of the rail system 108 in the buffer zone as well as the portion of the rail system 108 on storage columns that are to be removed cannot be used during rebuilding.

To ensure that container handling vehicles 201 avoid using the affected portions of the rail system 108 in the buffer zone and in the area that is being removed, the storage columns 105 in the affected portions of the rail system 108 are temporarily excluded from the available routes during rebuilding of the storage system 1. The excluded storage columns 105 of the buffer zone in the illustrated example are (10,1) to (10,6) and (6,6) to (6,9). These are in addition to the storage columns that are being removed or rebuilt, namely (6,7) to (10,7) and (11,1) to (11,6) in the illustrated example.

Figure 6:
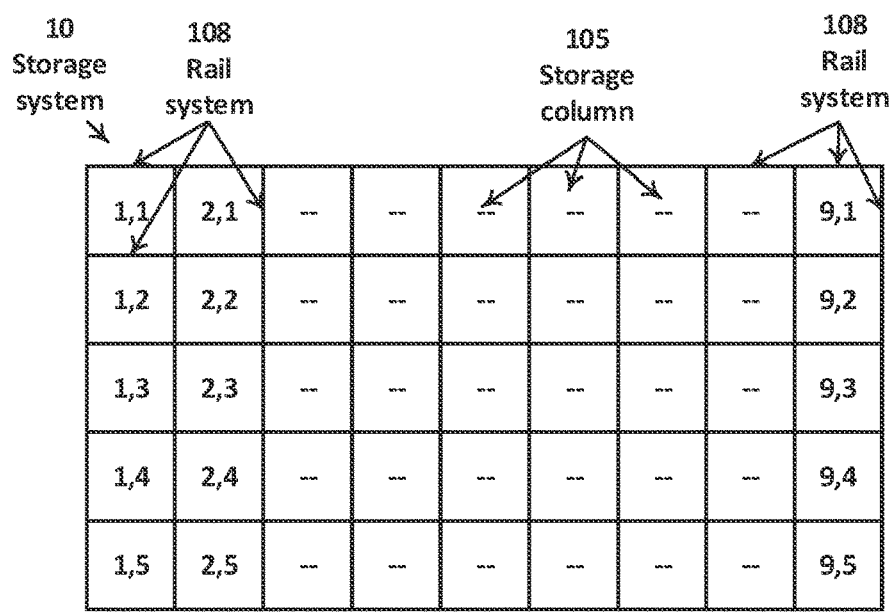
FIG. 6 is a top view of the storage and retrieval system and the available rail system during rebuilding.

FIG. 6 illustrates an unaffected zone of storage columns 105. These storage columns 105 offer available routes to the routing planner during a rebuilding phase. The storage and retrieval system will operate normally in this unaffected zone during the rebuilding phase. In the example used here, the routes available will be on the rail system 108 on top of the 45 storage columns 105 addressed as (1,1) to (9,5).

Figure 7:
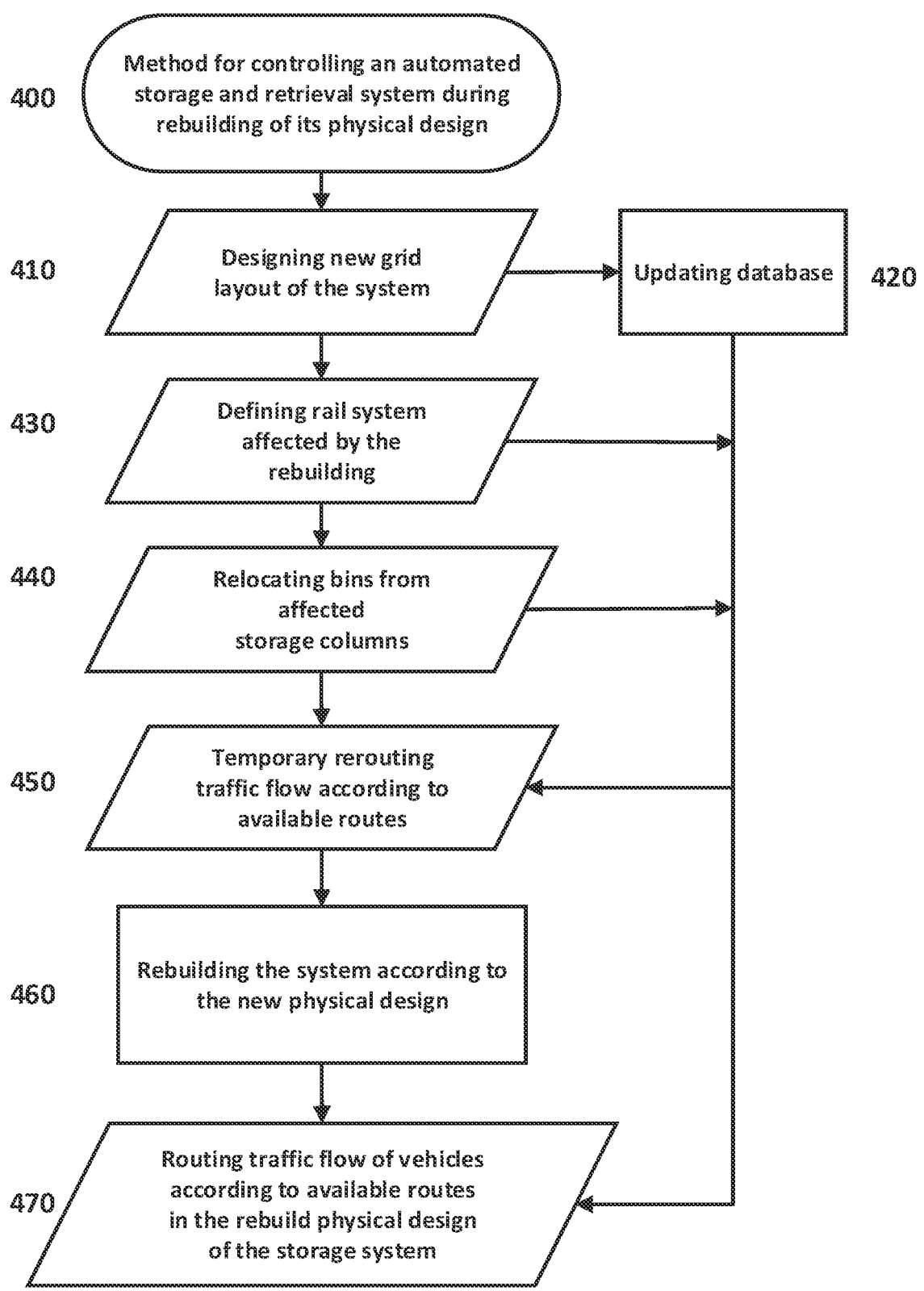
FIG. 7 is a flowchart illustrating the different steps of the method for controlling the storage and retrieval system during rebuilding in accordance with the new design.

FIG. 7 is a flow chart illustrating the different steps performed according to the method 400 for controlling an automated storage and retrieval system 1 during rebuilding of its physical design.

The steps of the method illustrate different phases, i.e. a planning and designing phase, a relocation phase, a rerouting phase, a rebuilding phase, and a final routing phase.

In the planning and designing phase, a new design is established by designing 410 a new or modified grid layout and rail system 108 of the storage system 1. This will typically be performed on a computer running a CAD program where the new design can be visualised and verified prior to being implemented. The computer program can be operated by a person designing a new layout or the program may automatically suggest a new grid design based on information of a modified floor plan of the facility where the storages system 1 is installed. A suggested grid design can then be accepted or rejected by an operator.

As mentioned, a central part of the storage system 1 is the database 210 comprising updated data with layout information of the framework of the storage grid structure 104, the rail system 108 and location information of container handling vehicles 201 and storage containers/bins 106.

When a new grid design and corresponding rail system 108 have been determined, the database 210 is updated 420 with this information. The rail system 108 affected by the rebuilding, i.e. the portion of the rail system 108 on storage columns in the buffer zone adjoining a portion of the rail system 108 on storage columns that are being added or removed, will then be defined 430 by comparing the existing design with the new, rebuilt design.

The database 210 keeps track of the different storage containers 106 and in which storage column 105 they currently are stored. The next step is to identify and relocate 440 storage containers 106 stored in storage columns 105 below a rail system 108 that is to be excluded from the available routes, for example, in the buffer zone and below a portion of the rail system that is being removed. The identified storage containers 106 are then relocated, for instance to storage columns 105 below a rail system 108 that will not be affected by the rebuilding. Storage containers 106 stored in storage columns 105 that will be removed in the new design will also be relocated prior to the rebuilding process.

When the relevant storage containers 106 have been relocated, the portion of the rail system that is affected by the rebuilding (e.g., the portion in the buffer zone as well as the portion on the storage columns which are being taken away) will then be excluded from a selection of available routes, the database 210 is updated 420 with this information, and the traffic flow of the container handling vehicles 201 will be temporarily rerouted 450 according to the identified available routes during a rebuilding process 460.

The rerouting is performed by the routing planner 200 according to updated information of the available routes during the rebuilding process and the routing planner 200 instructs a master controller 230 in each vehicle 201 assigned a job of transferring a storage container 106 to control and route the vehicles 201 according to the temporary available routes.

When the temporary rerouting step has been implemented, the automated storage and retrieval system 1 can be rebuilt according to the new physical design by adding and/or removing portions of framework and rail system 108.

When the rebuilding is completed, the portion of the rail system 108 in the buffer zone that was previously excluded from the selection of available routes, as well as the new portion of the rail system 108 that has been built, are now included as available routes, and the routing planner 200 implements a final routing step 470, where the traffic flow of the vehicles 201 is controlled according to the available routes on the rail system 108 after rebuilding the physical design of the automated storage and retrieval system 1.

New storage columns 105 of the rebuilt storage and retrieval system 1 are, according to one embodiment, filled with new storage containers 106. This is typically the case when the storage and retrieval system 1 is expanded with additional storage columns 105.

In one embodiment, physical blocking of the excluded portion of the rail system 108 is performed after step 450 of rerouting traffic flow. The physical blockage may for instance comprise objects, such as barriers, which are adapted to fit in or on the rail system 108 and that are stationary when placed on the portion of the rail system 108 to be excluded. A physical barrier will improve safety during a rebuilding process. The physical barrier is removed prior to the final routing step 470.

The routing steps of the method described above are executed by a computer program which is being executed by a processor in a routing planner 200 connected to a database 210 and controllers 220 of vehicles 230. These devices are all described above with reference to FIG. 2 and they are comprised in a control system 500 of the automated storage and retrieval system 1.

The preceding description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

The invention claimed is:

1. A method for controlling an automated storage and retrieval system during physical rebuilding of the automated storage and retrieval system, the automated storage and retrieval system comprising a framework structure forming a three-dimensional storage grid structure for storing storage containers, where the grid structure forms vertical storage columns each having same horizontal area defined by the size of an access opening of the vertical storage columns and where a rail system is arranged on the framework structure defining the circumference of each access opening on top of each storage column, the rail system providing available routes for container handling vehicles handling and transferring the storage containers to and from the storage columns, each vehicle comprising a vehicle controller communicating with a master controller, the master controller assigning jobs to each vehicle for handling and transferring the storage containers and controlling traffic flow of vehicles according to a routing planner, a database which comprises layout information of the rail system and location information of vehicles and storage containers is connected to the master controller and/or the routing planner, the routing planner determining an optimal route on the rail system for each vehicle based on the available routes according to the layout information of the rail system and location information of each vehicle and storage container, wherein the method comprises:
designing a new physical design of the framework structure and corresponding rail system;
designating a first portion of the rail system to be in a buffer zone where the rail system will be affected by the rebuilding and a second portion of the rail system that is to be added or removed from the automated storage and retrieval system, wherein the designating includes updating the database with layout information with the new physical design and the rail system affected by the rebuilding;
relocating storage containers having storage positions in columns below the first portion of the rail system in the buffer zone and the second portion of the rail system that is to be removed;
temporarily rerouting, by the routing planner, traffic flow of the container handling vehicles according to the available routes unaffected by the rebuilding, wherein the temporarily rerouting comprises updating the database with the layout information of the rail system which excludes from the available routes the first portion of the rail system that is in the buffer zone and the second portion of the rail system that is to be added or removed, and instructing the master controller, by the routing planner, to control the vehicles according to the available routes;
physically blocking access to the buffer zone by placing barriers on the first portion of the rail system in the buffer zone after temporarily rerouting the traffic flow;
rebuilding the automated storage and retrieval system according to the new physical design by adding and/or removing portions of framework structure and rail system;
removing the barriers;
updating the database with the layout information of the rail system which includes within the available routes the first portion of the rail system within the buffer zone and a new portion of the rail system which has been built, and using, by the routing planner, the updated layout information to route traffic flow of the vehicles on the rail system after rebuilding of the physical design of the automated storage and retrieval system.

2. The method according to claim 1, further comprising defining the buffer zone as the storage columns and corresponding portion of the rail system adjoining storage columns that is to be removed or added during rebuilding.

3. The method according to claim 1, further comprising updating the layout information in the database with addresses of storage columns according to the new physical design.

4. The method according to claim 1, further comprising filling new storage columns of the automated storage and retrieval system, after the rebuilding, with storage containers.

5. The method according to claim 1, where storage containers are relocated by moving the storage containers to storage columns unaffected by the rebuilding and/or to locations external to the automated storage and retrieval system.

6. The method according to claim 5, further comprising updating the location information of the database with new storage positions of relocated storage containers.

7. An automated storage and retrieval system having a control system for controlling operation of the system during physical rebuilding of the automated storage and retrieval system in accordance with the method of claim 1, the automated storage and retrieval system comprising a framework structure forming a three-dimensional storage grid structure for storing storage containers, where the grid structure forms vertical storage columns each having same horizontal area defined by the size of access opening of the vertical storage columns and where a rail system is arranged on the framework structure defining the circumference of each access opening on top of each storage column, the rail system providing available routes for container handling vehicles handling and transferring the storage containers to and from the storage columns, the control system comprises a master controller connected to a routing planner and to vehicle controllers of container handling vehicles for controlling traffic flow of the vehicles according to the routing planner, a database which comprises layout information of the rail system and location information of vehicles and storage containers is connected to the master controller and/or the routing planner, the layout information of the rail system being updated in the database at times during the designing, the temporarily rerouting and the using, by the routing planner, the updated layout information during the method of claim 1, wherein the routing planner is configured to determine an optimal route on the rail system for each vehicle based on the available routes according to the layout information of the rail system and location information of each vehicle and storage container that is stored on the database at that time, the available routes for the routing planner to choose from during the designing, the temporarily rerouting and the using, by the routing planner, the updated layout information being different in each case.

* * * * *